March 22, 1927.
S. S. LAW
1,622,157
OVERHEAD SIGNAL MIRROR
Filed Sept. 27, 1926
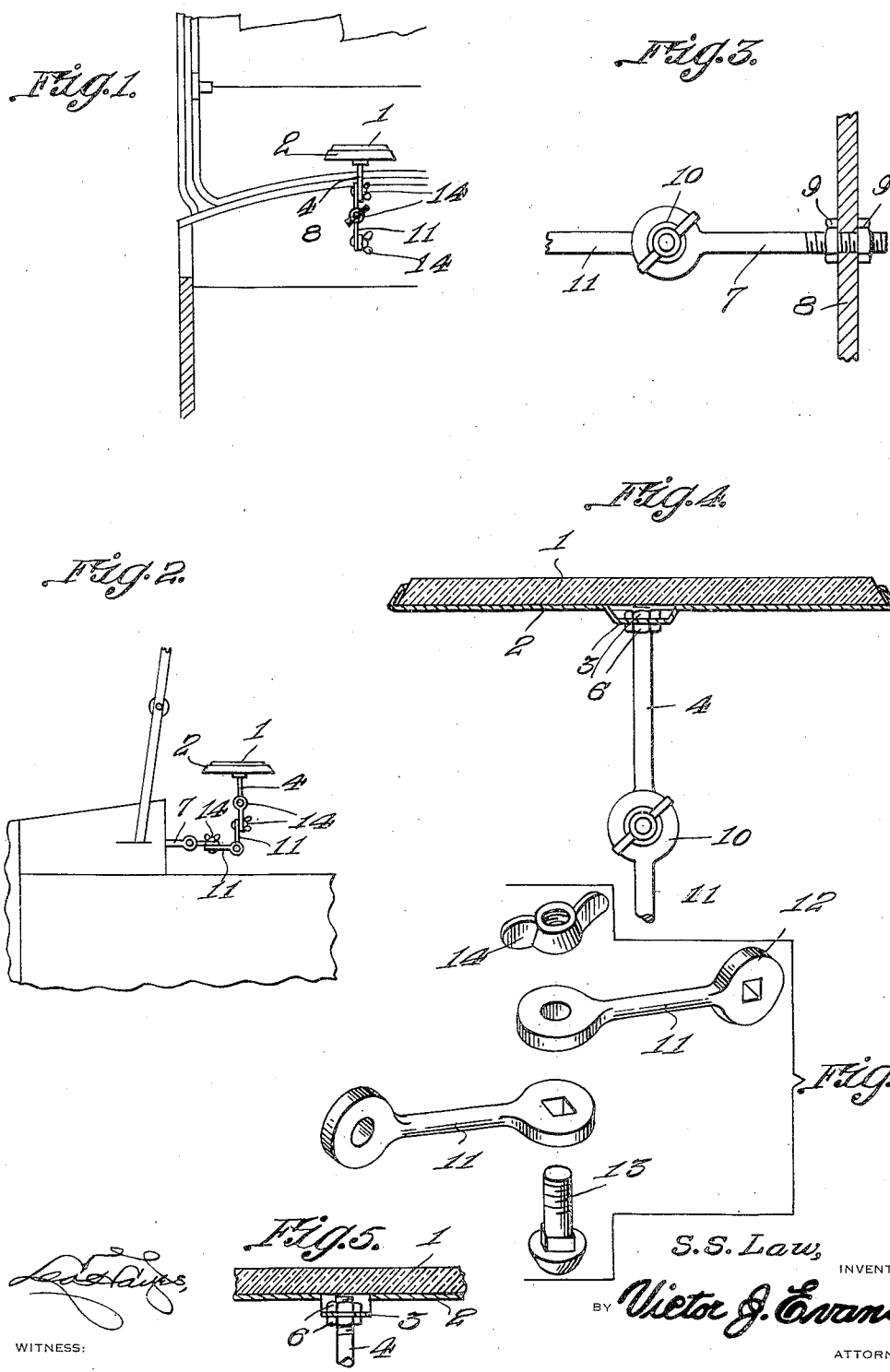

Patented Mar. 22, 1927.

UNITED STATES PATENT OFFICE.

SANFORD S. LAW, OF CORAOPOLIS, PENNSYLVANIA.

OVERHEAD SIGNAL MIRROR.

Application filed September 27, 1926. Serial No. 138,006.

This invention relates to a mirror for motor vehicles of all kinds, aeroplanes, street cars and the like, the general object of the invention being to so arrange the mirror that the driver of the vehicle can see overhead signals and other objects which would be ordinarily hidden from his view by the top of the vehicle.

Another object of the invention is to provide the mirror with an adjustable support so that it can be readily adjusted, as desired.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a fragmentary view of a motor vehicle, showing the invention thereon.

Figure 2 is a side view of Figure 1.

Figure 3 is a fragmentry view showing the connection to the instrument board of the vehicle.

Figure 4 is a sectional view through the mirror and showing part of its supporting means.

Figure 5 is a section on line 5—5 of Figure 4.

Figure 6 is a view of two of the supporting members and their connecting bolt, with the parts separated.

In these views, 1 indicates the mirror which is supported in the frame 2. This frame has its central part formed with a bracket 3 which is composed of a strip of the frame which is separated from the major portion of the frame by two slits, with the portion between the slits pushed out to form the bracket. A bar 4 is fastened to the bracket by the two nuts 6, the nuts engaging the two faces of the bracket. A similar bar 7 is connected to the instrument board 8 or other part of a vehicle by the two nuts 9. The outer end of each of these bars is provided with a rounded flat head 10 which has a central hole therein and these bars are connected together by the four links 11, each of which is formed with a flat head 12 at each end thereof, the head at one end being turned at rightangles to the head at the other end and one head is provided with a round hole and the other with a square hole. Bolts 13 are used to connect the links together and to the bars 4 and 7, each bolt being provided with a wing nut 14 for clamping the parts against movement. Each bolt is provided with a square part for engaging a square hole in one of the links so that the bolt is held against rotary movement when the nut is being turned.

The parts are preferably arranged as shown in Figures 1 and 2 so that the mirror will be in a horizontal position, but it will, of course, be understood that the supporting links can be adjusted so that the mirror can be held in any desired position.

This mirror will enable the operator of the vehicle to see signals which are arranged at a considerable height above the ground and which he could not ordinarily see without looking up. The mirror can also be used in aeroplanes so that the operator can see planes above him or make observations, and it can be used for other purposes.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a mirror, a rod connected with the rear thereof, said rod having an enlarged flat head having a hole therein, a similar rod adapted to be connected with a supporting member and links connecting the rods together, each link having an enlarged flat head at each end thereof with one head extending at rightangles to the other and bolts connecting the links together and the end links to the rods, each bolt having a wing nut.

In testimony whereof I affix my signature.

SANFORD S. LAW.